United States Patent
Aghasaryan et al.

(10) Patent No.: US 11,461,685 B2
(45) Date of Patent: Oct. 4, 2022

(54) DETERMINING PERFORMANCE IN A DISTRIBUTED APPLICATION OR SYSTEM

(71) Applicant: Alcatel Lucent, Nozay (FR)

(72) Inventors: Armen Aghasaryan, Nozay (FR); Makram Bouzid, Nozay (FR); Dimitre Davidov Kostadinov, Nozay (FR); Thomas Woo, Essex, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1253 days.

(21) Appl. No.: 15/788,198

(22) Filed: Oct. 19, 2017

(65) Prior Publication Data
US 2018/0121822 A1     May 3, 2018

(30) Foreign Application Priority Data
Oct. 28, 2016 (EP) .................................. 16306423

(51) Int. Cl.
*G06N 7/00*     (2006.01)
*G06F 11/36*     (2006.01)
(Continued)

(52) U.S. Cl.
CPC ........... *G06N 7/005* (2013.01); *G06F 11/079* (2013.01); *G06F 11/3433* (2013.01);
(Continued)

(58) Field of Classification Search
CPC ... G06N 7/005; G06F 11/3668; G06F 11/079; G06F 11/3447; G06F 11/3433;
(Continued)

(56) References Cited

U.S. PATENT DOCUMENTS

| 7,882,075 B2 * | 2/2011 | Suzuki | ................ G06F 11/3452 |
| | | | 707/672 |
| 10,909,279 B2 * | 2/2021 | Gardner | .................. G06F 30/00 |

(Continued)

OTHER PUBLICATIONS

A. Brown et. al. "An active approach to characterizing dynamic dependencies for problem determination in a distributed environment." IEEE/IFIP International Symposium on Integrated Network Management Proceeding, May 18, 2001 (May 18, 2001), pp. 377-390, XP055279965 (Year: 2001).*

(Continued)

*Primary Examiner* — Brian Whipple
*Assistant Examiner* — James Ross Hollister
(74) *Attorney, Agent, or Firm* — Harness, Dickey & Pierce, P.L.C.

(57) ABSTRACT

In one embodiment, the method includes determining one or more nodes associated with a treatment of a query; generating one or more stimuli associated with the treatment of the query wherein the or each stimulus are likely to perturb one or more resources within a system; measuring data at the or each node relating to the resources to determine the effect of the or each stimuli at the or each node; identifying one or more pairs of nodes which have a correlation in the measured data; transforming the correlation into a causal relationships where the cause is a measuring device measuring the response and the consequences are the other correlated measuring devices; generating a list of causal relationships; and combining different causal relationships into a causal model so that a chain of causal propagations can be built.

14 Claims, 3 Drawing Sheets

(51) Int. Cl.
*G06F 11/07* (2006.01)
*G06F 11/34* (2006.01)
*H04L 67/1001* (2022.01)
*H04L 41/0677* (2022.01)

(52) U.S. Cl.
CPC ...... *G06F 11/3447* (2013.01); *G06F 11/3668* (2013.01); *H04L 41/0677* (2013.01); *H04L 67/1001* (2022.05); *G06F 11/3414* (2013.01); *G06F 2201/815* (2013.01); *G06F 2201/865* (2013.01)

(58) Field of Classification Search
CPC ........... G06F 2201/815; G06F 11/3414; G06F 2201/865; H04L 41/0677; H04L 67/1002
See application file for complete search history.

(56) References Cited

U.S. PATENT DOCUMENTS

| | | | | |
|---|---|---|---|---|
| 2006/0069786 A1* | 3/2006 | Mogul | ................. | G06F 9/5005 709/229 |
| 2009/0216624 A1* | 8/2009 | Kato | ........................ | G06N 5/02 705/7.38 |
| 2012/0197626 A1* | 8/2012 | Kejariwal | ........... | G06F 11/3466 703/22 |
| 2012/0331441 A1* | 12/2012 | Adamson | ................ | H04L 67/14 717/102 |
| 2015/0020076 A1* | 1/2015 | Lei | ............................ | G06F 9/50 718/104 |
| 2016/0314064 A1* | 10/2016 | Moretto | .............. | H04L 41/5035 |
| 2017/0075749 A1* | 3/2017 | Ambichl | ............. | G06F 11/0748 |

OTHER PUBLICATIONS

Extended European Search Report 16306423.1 dated Mar. 13, 2017.
A. Brown et. al. An active approach to characterizing dynamic dependencies for problem determination in a distributed environment. IEEE/IFIP International Symposium on Integrated Network Management Proceeding, May 18, 2001 (May 18, 2001), pp. 377-390, XP055279965.
European Office Action dated Mar. 28, 2019, issued in corresponding European Patent Application No. 16306423.1.

* cited by examiner

FIG.7

DETERMINING PERFORMANCE IN A DISTRIBUTED APPLICATION OR SYSTEM

CROSS-REFERENCE TO RELATED APPLICATIONS

The present application claims priority under 35 U.S.C. § 119 to European Patent Application No. 16306423.1, filed on Oct. 28, 2016, in the European Intellectual Property Office, the entire contents of which are hereby incorporated by reference.

FIELD OF THE INVENTION

The present invention relates to improvements in or relating to methods, systems and equipment for determining performance in a distributed application or system, particularly to such methods, systems and equipment for determining an automated test environment which may determine latent performance degradations.

BACKGROUND OF THE INVENTION

Modern network applications are highly complex multi-tiered distributed systems which include a dynamic set of interdependent nodes often running in a virtual cloud-based environment. In such environments, software and hardware failure or a latent performance degradation in a node can spread across some or all of the nodes and result in a severe degradation of the overall global system performances. The localization of an original source for any such problems, is not straightforward due to a lack of understanding of network dependencies.

Examples of distributed systems span from the domain of web applications to emerging telecommunications technologies. An example of an emerging technology is Network Function Virtualization (NFV), which transforms network services such as load balancing, firewalls, or traffic analysis into software applications running in a cloud-based infrastructure. NFV will be useful due to its ability to anticipate, localize and fix any Quality of Service (QoS) issues and failures.

One particular problem is latent performance degradations. For instance, situations where shared resources on a physical server are congested. This is often referred to as "noisy neighbor problem", and may propagate to other application nodes. This can result in a global performance degradation perceived by the application client (an end-user or another application). A further problem in this environment is the lack of capability to learn the behavior of a distributed application and automatically build a dependency model for Quality of Service management and root cause analysis. Typically this can be implemented to some extent at a human level, but the ability to automate such processes is still being sought.

There are many examples of application test environments and niche tools for application modeling. Unfortunately these do not tend to provide a methodical, automated approach. For example, "TryStack" offers a free large "OpenStack" cluster for developers to test applications, and "jMeter" may be used for testing the functional behavior of web applications and measure their performance under different input loads. Other examples are passive application or infrastructure monitoring tools such as "Packet-Beat" and "Nagios".

The information gathered from most test environments and tools can be analyzed to learn the normal behavior of a system and/or an application and discover any component dependencies using state of the art methodologies, such as time series correlations and causalities inference algorithms. The identified dependencies will generally only reflect normal behavioral modes and would not take into account any failures or performance degradation situations caused by computing resource insufficiencies occurring in application or system nodes.

Other, more elaborated approaches involve annotating distributed application requests through modified middleware and common libraries, protocols and software systems in order to derive a comprehensive view of application behavior. These solutions are computationally heavy and costly to implement.

A system called the "Sherlock" system derives a probabilistic dependency graph between system components and builds a multi-level probabilistic inference model capturing the relationships between heterogeneous network components in enterprise networks. This can be done only by analyzing network packet traces and traceroute measurements. Typically, such systems operate in a passive way and do not capture system dependencies in any situations.

Spectrum-based fault localization approaches keep track of components which take part in the execution of tasks together with their status (success or failure). These approaches then provide a ranked list of fault candidates which could explain the observed task failures. Spectrum-based fault localization approaches may detect faults in unmonitored components. However, they apply only to hard faults which cause tasks to fail and are unable to detect performance degradation issues when the task still succeeds.

There is currently no solution offering an automated test environment and tools to stimulate the distributed application in a globally coordinated way and derive its complete behavioral model (including failures, latent performance degradations, and the normal behaviors). Thus a need exists to find a more expansive and functional system and method for testing network nodes and improving the handling of predictable network problems.

A further object of the present invention is to overcome at least some of the problems associated with existing systems, methods and equipment.

SUMMARY OF THE INVENTION

According to one aspect of the present invention there is provided a method of determining system problems within a defined controlled environment having a least part of the environment linked with a virtual infrastructure, the system problems being associated with the treatment of a query instigated, in use, by a user, the method comprising: determining one or more nodes associated with the treatment of the query; generating one or more stimuli associated with the treatment of the query wherein the or each stimulus are likely to perturb one or more resources within the system; measuring data at the or each node relating to the resources to determine the effect of the or each stimuli at the or each node; identifying one or more pairs of nodes which have a correlation in the measured data; transforming the correlation into a causal relationships where the cause is a measuring device measuring the perturbed resource and the consequences are the other correlated measuring devices; generating a list of causal relationships; and combining different causal relationships into a causal model so that a chain of causal propagations can be built.

According to a second aspect of the present invention there is provided an automated sandbox deployed in a controlled cloud environment having a least part of the environment linked with a virtual infrastructure, the sandbox for monitoring problems associated with the treatment of a query instigated, in use, by a user, the sandbox comprising: a determination module for determining one or more nodes associated with the treatment of the query; a stimulus generating module for generating one or more stimuli associated with the treatment of the query wherein the or each stimulus are likely to perturb one or more resources within the system; a measurement device for measuring data at the or each node relating to the resources to determine the effect of the or each stimuli at the or each node; a correlation module for identifying one or more pairs of nodes which have a correlation in the measured data; and a model creation module for: transforming the correlation into a causal relationships where the cause is the measuring device measuring the perturbed resource and the consequences are the other correlated measuring devices; generating a list of causal relationships; combining different causal relationships into a causal model so that a chain of causal propagations can be built.

Advantageously, various embodiments are provided by features as defined in the dependent claims.

BRIEF DESCRIPTION OF THE DRAWINGS

The present invention will now be described, by way of example, to the accompanying drawings in which.

DESCRIPTION OF THE INVENTION

In broad terms the present invention relates to a fault model-based approach to network problems and degradation in performance, which represents the global system behavior as a combination of elementary behavioral features such as "tiles". There is no need to explicitly represent the global system using this approach. The invention may be relevant to telecommunication networks and includes automatic learning of the elementary behaviors. This gives rise to a global solution offering an automated test environment and tools to stimulate a distributed application in a globally coordinated way and derive its complete behavioral model (including failures, latent performance degradations, and the normal behaviors). The invention encompasses the reuse and combination of some existing tools, in a globally coordinated system which permits a series of controlled perturbations to take place on computing resources and to derive any causal dependencies associated with performance degradation or failure propagation from one component to another.

An embodiment of the invention provides a fully automated sandbox deployed in a controlled cloud environment. At any time there is one application running within the sandbox so that the investigation of its behavior can be carried out without interference from any other application or process.

Figure 1:
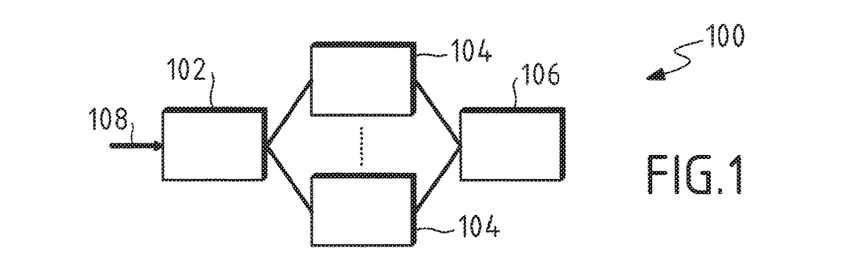
FIG. 1 is a block diagram of a distributed application, according to an aspect of the present invention.

Referring to FIG. 1, a WordPress-based application 100 is presented. The application 100 may comprise a load balancer 102, several web servers 104 and a database 106. Each component is deployed on a separate virtual machine (VM) or node. In order to distribute the load among the web servers, the load balancer uses for example a Least Connections algorithm which comprises selecting the server that hosts the fewest number of connections. In order to build a response to a query 108, a chosen web server makes requests to the database and sends back the received response to the load balancer which in turn replies to the query originator, as will be described in greater detail below. A query is any communication from a user requesting communication with, or data from, an application.

Figure 2:
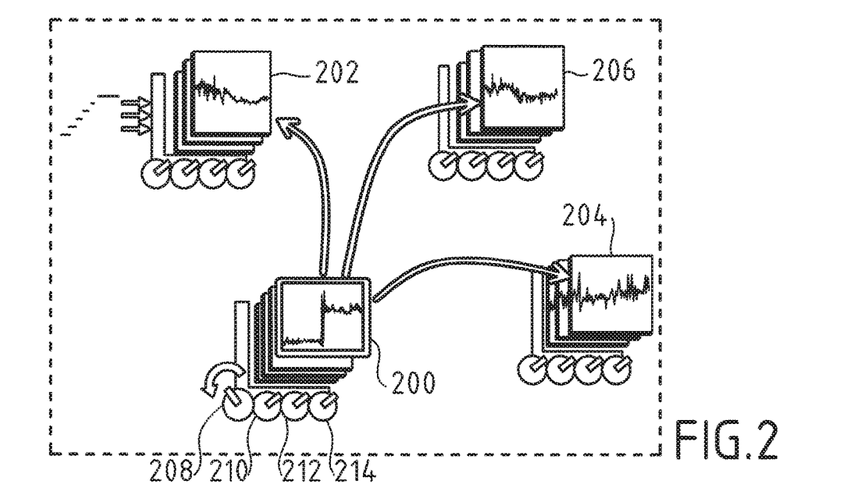
FIG. 2 is a block diagram of a stimulus propagation in a simple network, according to an aspect of the present invention.

Turning now to FIG. 2, a first central processing unit (CPU) 200 may be associated with a second CPU 202, a network 204 and a possible input load 206. The association may be discovered by the present invention by triggering a resource limitation on one node. The first CPU and the second CPU are referred to as resources. A node is any software program (e.g. running in a virtual machine) which relies on or uses different computing resources (CPU, network bandwidth, RAM, etc. and which may be involved in the receipt and treatment of a query. An alternative to a Virtual Machine is a Docker container; which represent a virtualization technology alternative to a virtual machine, and which is increasingly used in cloud computing platforms.

By perturbing the first CPU it is possible to observe the immediate impact on the other nodes associated therewith. In this application the node which is perturbed is referred to as a primary node and the other nodes are secondary or other nodes. In this case, the second CPU 202, the neighboring network throughput in another node 204 or response time of the global system. The second CPU may correspond to a web server taking up an additional charge which cannot be completed by a first webserver co-associated with the first CPU. The response time may be measured using a load balancer, it will eventually carry the impact of the perturbation.

The CPU resource is perturbed by perturbing CPU resource at a node. A node is also referred to as an application node and may include a software module such as a webserver, load balancer, data base, etc.; a virtual machine; etc. A perturbation is a stress or strain which is imposed on the resource to change it so that any reaction thereto can be established. An impacted resource may be local to the node where the perturbation occurs or remote. Resources may include CPU capability 208; memory capability 210, local input/output capabilities 212, network input/output capabilities 214 and any other appropriate capabilities. By perturbing a CPU resource capacity in one node the reaction of other nodes can be measured and monitored.

Each individual perturbation acts as a stimulus to the performance meters or measurement devices of the node at which the perturbation occurs, and at any other associated virtual machines or nodes and determines what makes them react accordingly. The stimulus is also referred to as a root cause as it is this which may give rise to problems within the network, system or a predetermined set of nodes which have been identified for analysis. The stimulus may cause a response from each associated node and it is this that the invention seeks to determine and model. By determining and modeling the response or actions to a given stimulus an accurate and automatic model of the system and its responses can be formed. In the example shown in FIG. 2, the stimulus is on the CPU, however it will be appreciated that the stimulus could be applied elsewhere on the node, for example the memory or any input/output application or port.

The stimulus essentially propagates through the system and any response from a node can be determined. As a result any correlations in the responses of different nodes can be determined by an appropriate measuring device or meter. This is important as it provide evidence of any causal relationship between nodes which may be impacted by a specific type of perturbation. Each stimulus provides the opportunity to model a set of elementary causal relationships between resource states. The model and correlations can be combined to represent more complex fault propagation trajectories across the entire topology of nodes. The set of possible causal relationships associated with each stimulus provides a causal fault propagation model which can be used for fault localization in real-time.

It should be noted that the present invention provides a capability to link correlation analysis of a response with a causal effect. If there is a reaction from a specific node, i.e. there is a correlation between the specific node and the primary node (that at which the perturbation occurs) there must be a causal link between the specific node and the primary node. This concept has previously been theoretically possible but has not been achievable in reality. However, the present invention has achieved this linkage in practice as will be described in greater detail below.

Figure 3:
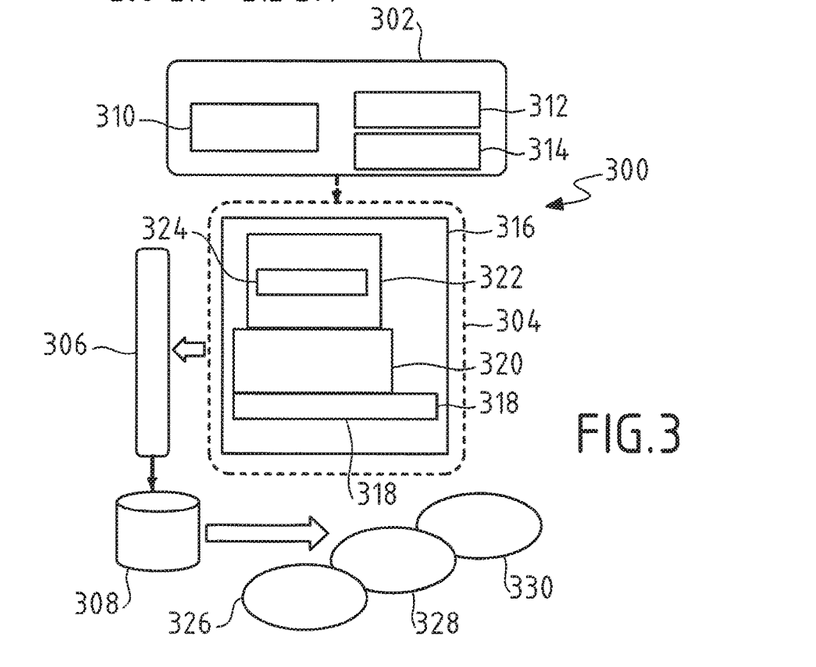
FIG. 3 is a block diagram of an architecture for application profiling, according to an aspect of the present invention.

The general architecture of the system 300, according to the present invention is shown in FIG. 3. The system makes use of a distributed application profiling approach and is comprised of a number of modules. A sandbox 302 is in operational connection with a cloud infrastructure 304, such as an OpenStack-based cloud infrastructure which is monitored by a monitoring module 306. Data is stored in a storage module 308. The sandbox 302 includes a deployment module 310, an execution module 312 and an individual stimuli module 314. The OpenStack-based cloud infrastructure 304 includes a physical machine (physical host or server) 316 which may include a Linux operating system 318 and a hypervisor 320. In addition the physical machine may be support or execute a virtual machine 322 also operating an operating system such as Linux 324.

The monitoring module 306 is capable of monitoring any relevant performance metering data from the system and store the data in the data storage module. The stored data can then be exploited for different purposes, e.g. for learning causal models 326, 328, and 330 (without any prior expertise on their behavior) and therefore for enabling the root cause analysis of failures and latent performance degradations propagating between the application nodes. Another example of the stored data exploitation includes an early testing of an application (before its operational deployment) under different resource limitations, allowing the identification of resource bottlenecks, and to define adequate capacity dimensioning policies or to estimate operational costs. Discovery of anomaly detection schemes (e.g. learning the adequate alarm generation thresholds) is yet another usage of the collected data. The data may also enable the building of a platform with labeled data generation capability for testing various correlation, causality inference and machine learning techniques.

Figure 4:
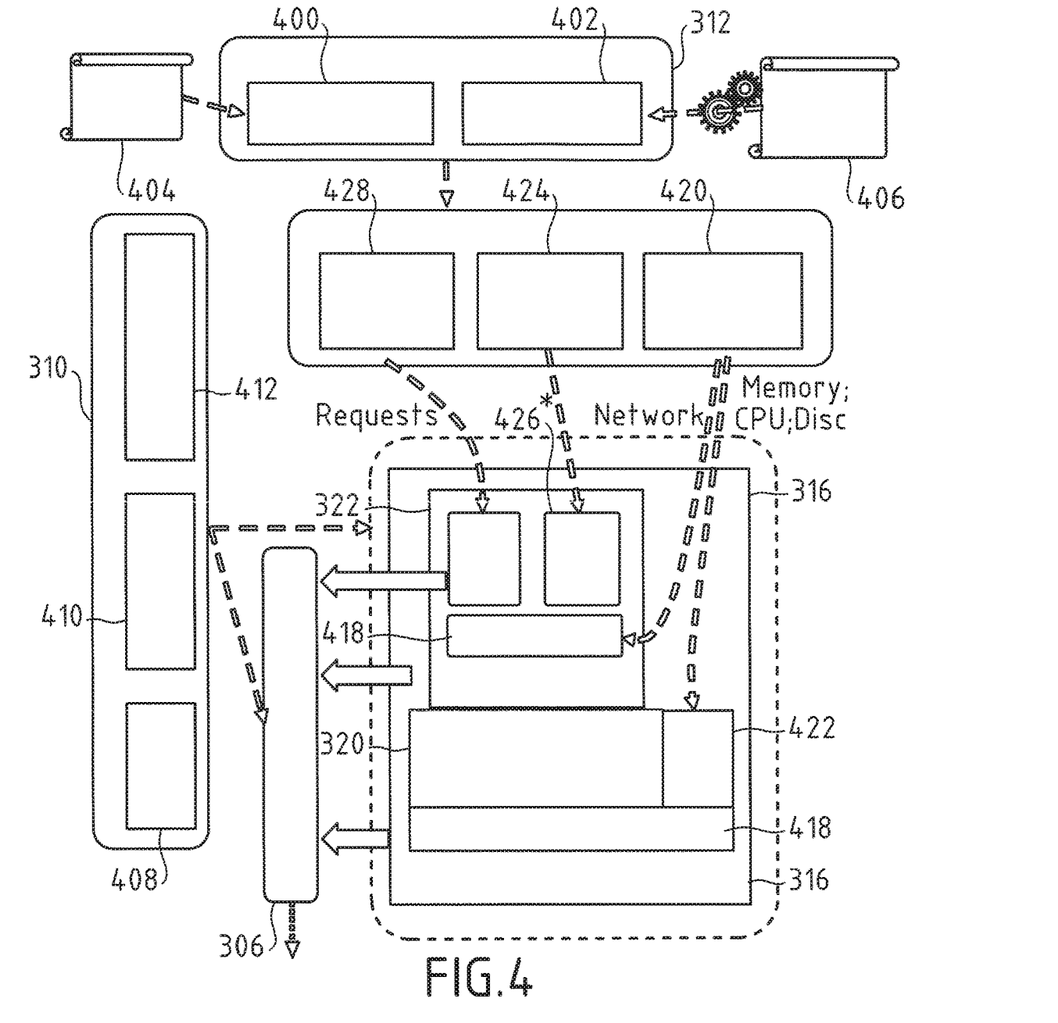
FIG. 4 is a block diagram showing a sandbox architecture, according to an embodiment of the present invention.

FIG. 4 shows a more detailed diagram of the sandbox architecture. The entire process of sandbox deployment 310 can be automated by the sandbox execution module 312 using one or more orchestration and configuration engines 400, 402. There may be two different types of orchestration based module, one of which is, for example, an Ansible based orchestration module 400 which is driven by a stimuli playbook 404 and the other of which may be a Python based orchestration module 402 which is driven by a JavaScript stimuli scenario module 406. Other forms of orchestration module may be used instead of the two examples mentioned above. The execution process of the sandbox can alternatively be orchestrated through an appropriate graphical user interface (GUI). The stimulation playbook or scenario module can be put together manually by a user or automated by an appropriate module.

The sandbox deployment module 310 includes a fact collection module 408, a module for activation and control of monitoring tools 410, and an application load Generation module 412.

As part of the sandbox deployment process a phase of data collection is carried out using, for example, an OpenStack Nova API (not shown) and some Linux kernel functions 418. The fact collection automatically discovers the application nodes deployed on a private cloud. The fact collection may also include the discovery of the allocated resource capacities of each node. The fact collection may also capture data from other places depending on the nature of stimulus or perturbation and the analysis being performed.

The sandbox may perform resource monitoring 306 on at least three layers, such as: a cloud or physical layer, a virtual layer and at an application layer. This is done using various tools including, for example, OpenStack Ceilometer, Packetbeat and other metering agents or applications. The appropriate tool may be activated automatically during the execution of a test series as will be described below.

The orchestrator 400 or 402 may also activate the application load generator 412. For example, if the application accepts RESTful queries, a load generation tool such as Jmeter may be used to emulate a set of users executing sample queries. Representational state transfer (REST) or RESTful web services are one way of providing interoperability between computer systems on the Internet. REST-compliant web services allow requesting systems to access and manipulate textual representations of web resources using a uniform and predefined set of stateless operations.

In the execution process 312, the sandbox receives one or more input stimulus policies (not shown) which specify the perturbations to be applied to each resource type, one resource at a time. A stimulation policy may comprise one or more individual policies or stimuli or may include more or more orchestration policies. A different orchestration policy may include the same stimuli in a different order or a completely different set of stimuli. A typical stimulus policy specifies an interval of resource capacity values (e.g. 100%; 90%; 80% and so on) and a step size (e.g. 10%) within the interval to raise or lower the level of the capacity perturbations. The sandbox may support any number of stimuli of which three types are described in greater detail below.

One type of stimulus is a negative resource stimulus 420 which represents a low resource consumption given the application load. This may be brought about by an intrinsic lack of resource or because of resource overprovisioning, i.e.

another node on the same physical cloud concurrently consumes the same limited resource. This negative resource stimulus can be emulated in a number of different ways: for example, by dynamically restricting the resource quotas for a given node.

Stimulus Enforcement Negative perturbations aim at dynamically restricting the nodes resource capacities: the memory (RAM) quota, CPU time available for the node, the disk I/O bandwidth, and the network I/O bandwidth. The first three resource types are addressed by using a toolkit, such as Libvirt 422, on a multi-hypervisor API 320 which can interact with the virtualization capabilities of Linux versions. The hypervisor and the associated library are tasked with controlling the manner in which virtualization occurs and is it important to analyze responses at this layer in a cloud environment. Network perturbations are done using a Linux kernel 418 tool such as 'traffic control' or any other appropriate tool. This type of perturbation is that which s most likely to be used to determine issues at the virtualization layer.

A second type of stimulus is a positive resource stimulus 424 which represents a high resource consumption given the application load. This may be brought about by the presence of a malware, or an ongoing software update at the node. This negative resource stimulus can be emulated in a number of different ways: for example, with the help of a parasite process internal to the node, which consume the given resource.

Positive perturbations are carried out by launching parasite processes co-located with the application nodes on the same node. To create a CPU and RAM overconsumption a stress tool 426 can be used which launches a desired number of dummy processes which consume the CPU or allocate/free memory. To change network bandwidth a pair of client-server threads are launched which communicate together and occupy the incoming/outgoing network bandwidth. Finally, a stimulus on disk is generated through custom scripts executing read and write operations with random data.

A third type of stimulus is a positive load stimulus 428 which comprises creating a resource deficiency by increasing the application load. In the previous examples, the resource consumption levels reveal anomalies or failures, here the resource insufficiency is typically in some way normal and reveals a bottleneck.

Positive load perturbation entails changing the request rate at which queries are sent to the application. This is done by gradually increasing the number of user threads in a module such as Jmeter.

Each stimulus creates a set of perturbations in one or more resources which expand across the network at one or more of the layers mentioned above. Measurements of resources at any node can then be made using appropriate meters or other measuring devices. The nodes from which measurements are made will depend on the tests and analyses being carried out. The measurements will be collected and returned to the primary node or to any other appropriate monitoring module at the primary node or elsewhere. The measurements will be analyzed and results determined.

All the measurements as well as stimulus events (including timestamps, stimulated resource, and the applied parameters) are stored in a database. The data can be extracted from the database for batch processing or replayed to emulate a real-time flow of the data.

There a many possible usages of the data collected within the application profiling sandbox to determine one or more problems or potential problems in the network or system. These include the following: discovery of anomaly detection schemes such as alert learning; resource bottleneck detection or identification of sensitive resources; general purpose testing of an application before operational deployment, application capacity testing and operational cost estimation. In an embodiment of the present invention, a focus is on a causal model derivation.

Causal model learning is essential to model-based fault diagnosis approaches which rely on a prior knowledge of causal relationships between monitored entities or nodes. The present invention proves for a fault model which can be automatically built within a defined controlled environment. Any appropriate causal model could be used and examples are set out below.

Figure 5:
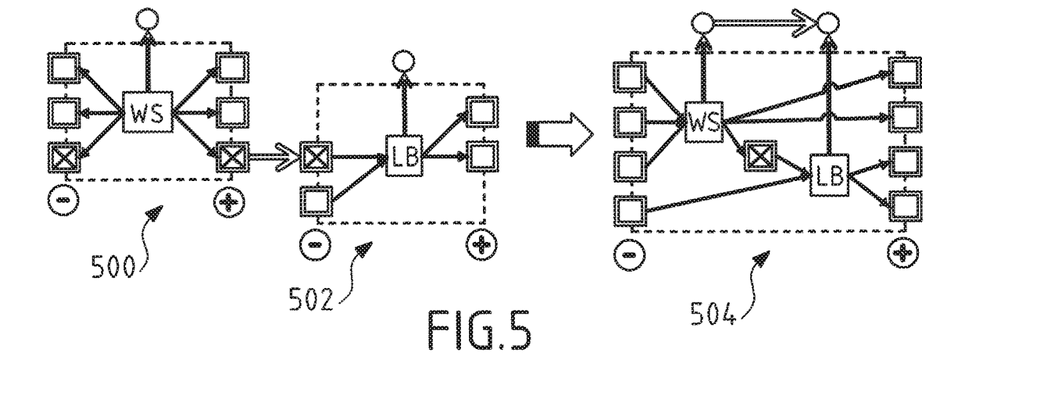
FIG. 5 is a diagram of connected tiles showing a causal relationship, according to an embodiment of the present invention.

Referring to FIG. 5, a causal model may rely on elementary fault behaviors, for example a so-called tile. A tile is defined for a node type (e.g. Webserver, Load Balancer, Database, etc.) and is composed of a hidden part which may comprise pre-conditions and post-conditions in different resource types, and a visible part which may comprise alarms and the like. The tile has a likelihood score, based on the likelihood of it being triggered wherever certain conditions are satisfied. A set of tiles can be made into a puzzle to represent a fault propagation across a distributed system. The set of tiles are generally connected in a way to match their respective post- and pre-conditions. As a result, the connected tiles form a causal relationship. The example illustrated shows how the tiles representing two fault situations can be connected: the left side tile 500 represents an alarm on CPU insufficiency on a web-server, and the right one 502 represents an alarm on excessive response time on a load balancer. A small number of simple tiles like these can be used to represent a complex fault propagation pattern 504.

The modelling framework is very robust with respect to the alarm generation mechanism as the tiles can take into account missing observations. Tiles with no observed alarm can still contribute to the fault propagation and will impact the global likelihood of the propagation pattern occurring.

A first step in the analysis of data generated by the sandbox comprises the identification of pairs of correlated performance meters for each stimulus. A Pearson correlation coefficient may be used for the correlation process. Other correlation or matching techniques are also possible. Any meter pairs below a predetermined threshold on the coefficient may be filtered out from further analysis. The meters can be replaced with corresponding alarms triggered on lower and upper thresholds or any other appropriate measuring device.

A tile-based model of the system being tested can then be derived. This can be carried out in a number of different ways.

The sandbox provides one or more basic truths on one or more root causes for a problem in the network, set of nodes or system. One root cause can be generated for each stimulus. Moreover, each stimulus can be associated with a specific measuring device. For example, CPU limitation on a given node can be observed using a CPU utilization meter. This means that the correlated pairs of measuring devices or alarms identified in the matching or correlation techniques above can now be transformed into causal relationships where the cause is the measuring device directly measuring the stimulated resource and the consequences are the other correlated measuring devices. The correlated pairs where neither of the two meters measures the stimulated resource will be skipped. In a first instance, local causal relationships may be identified. Local causal relationships are those where the consequences are measured on the same application node as the generated stimulus or root cause. For example, the CPU limitation may cause a drop in network bandwidth consumption. In a next stage distant consequences can be determined. Distant or remote consequences can cause the primary node to give rise to a traffic limitation or other response at a distant node.

In addition, these distant consequences as determined by an appropriate measuring device, can also give rise to causes in the case of their own local stimuli. The introduction of hidden variables such as for example, pre-/post-conditions enables a multiple possible dependency scenario to represent in a compact way with a small number of elementary tiles (see 504). The likelihood of a given tile being triggered in a predetermined condition is derived by aggregating correlation coefficients associated with different resource instances of the same type conforming to the same tile. It should be noted that: the tiles are defined in terms of node types and resource types and therefore when a tile is derived evidence is obtained from different instances of correlations between meters of respective node and resource types. As a result, the tile's likelihood may be computed as an aggregated value of the underlying evidence; for example, an average value of their correlation coefficients.

An important element of the present invention, is the ability to learn and to model the behavior at the virtual layer. A causal model may be formed by combining different causal relationships into the model so that a chain of causal propagations can be built. A model can be used in real-time for a different instantiation or deployment of the same application, e.g. a deployment with a different number of nodes (of the same types as those experimented within the sandbox). Each individual tile represents an elementary causal dependence between two sets of resource conditions. The model is a collection of all the tiles, so that they can be connected to represent more complex fault propagations eventually spanning across multiple nodes.

Figure 6:
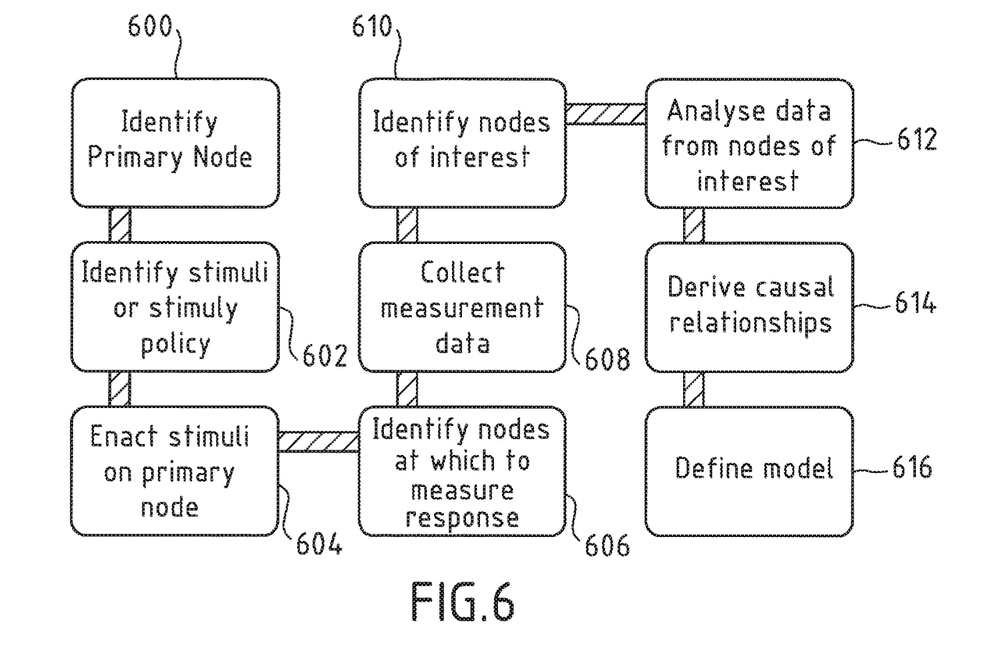
FIG. 6 is a flow diagram of the method steps for determining performance degradation, according to an embodiment of the present invention.

Referring now to FIG. 6 the method steps of the present invention will now be described. In a first step 600 the primary node is identified. This step may be repeated for a different primary node, i.e. looping through a set of primary nodes, covering eventually all the nodes of the applications in the role of a primary node. In step 602 a stimulus or stimuli policy is identified. At step 604 the stimuli are enacted and at step 606 nodes at which measurements are to be made are identified. The data from the identified nodes is collected at step 608. The nodes of interest are identified at step 610, as will be described in more detail in FIG. 7. Data is analyzed at step 612 from the nodes of interest. This enables a causal relationship between nodes to be derived at step 614. The model is then defined at step 616.

Figure 7:
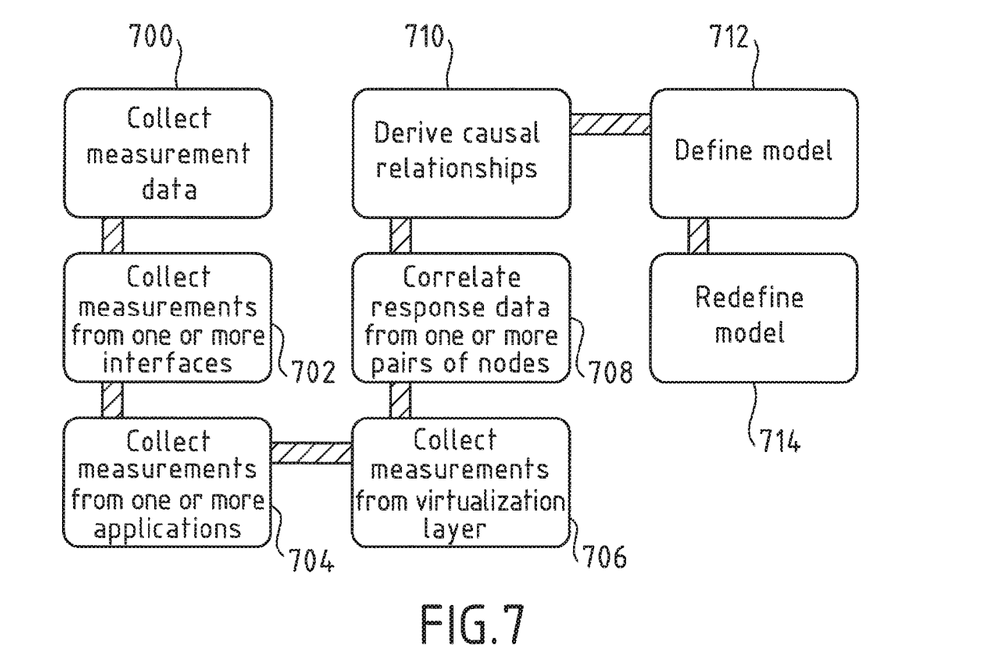
FIG. 7 is a flow diagram of the method steps for part of the processing method, according to an embodiment of the present invention.

Referring now to FIG. 7 the method steps of part of the data processing steps of the present invention will now be described. In a first step 700 the data from the identified nodes is collected. In step 702 this data is collected from one of more interfaces. In step 704 data is collected from one or more applications within the system. At step 706 the data is collected from the virtualization layer. The response data from one of more pairs of node is analyzed to determine a correlation or match at step 708. This enables causal relationships to be derived in step 710 and the model may be defined in step 712. If required the model may be redefined at step 714 if changes are made or more data is collected.

In the example shown in FIG. 7 measurements are made at different layers: the "application" layer, the "virtual" layer (e.g. monitoring Virtual Machines or Docker containers), and "physical" layer. In one embodiment measurements are made and data collected at all layers. However, it will be appreciated that it is not necessary to conduct the collection and analysis at all layers in all embodiment. In addition, it should be noted that the data collected at the different layers may include one or more of the nodes associated with each respective layer or may include one or more nodes from only one or more selected types of layer. The three layers mentioned are examples and are not restricted to the three described and may include more or less different layers.

A main component is any computer related invention is a physical machine or computer, which may be equipped with at least a processor, memory, a number of data storage devices, keyboard, mouse, display etc. The computer can also include any other necessary hardware, such as a printer, other types of CAD input devices, and an optical (e.g., laser) scanner or other means suitable for detecting data associate with the one or more stimuli. The computer is also equipped with appropriate software for the functions required to be carried out by the system. The system may operate on a single device or over multiple devices connected for communication via a network. The software may be provided as a computer program comprising program code for the execution of any method or process when the program is carried out on a computer or computer system.

It will be appreciated that the system and method has been described with reference to a number of different embodiments. These embodiments are not intended to be limitative and many variations are possible which will still fall within the scope of the present invention. The invention may be implemented in software, hardware or any combination thereof. Elements that are now illustrated as software can be changed to equivalent hardware elements and vice versa.

The invention claimed is:

1. A method of determining system problems within a defined controlled environment having at least part of the environment linked with a virtual infrastructure, the system problems being associated with treatment of a query instigated, in use, by a user, the method comprising:
    determining one or more nodes associated with the treatment of the query, wherein a node is an occurrence of at least one of a virtual machine, or a software program;
    generating one or more stimuli associated with the treatment of the query wherein at least one or each of the one or more stimuli is configured to perturb one or more resources within the system;
    measuring data at each or at least one of the one or more nodes relating to the resources to determine the effect of the each or at least one stimuli at each or at least one of the one or more nodes;
    pairing the one or more nodes in one or more groups of two or more nodes, wherein each group has an identified correlation in the measured data;
    transforming the correlation into a causal relationships where the cause is a measuring device directly measuring the stimulated resource and the consequences are other correlated measuring devices;
    generating a list of causal relationships; and
    combining different causal relationships into a causal model so that a chain of causal propagations can be built,
    wherein the stimuli comprise at least one of a negative resource stimulus, a positive resource stimulus, and a positive load stimulus.

2. The method according to claim 1 wherein at least one or each of the one or more stimuli creates a set of perturbations in one or more resources which expand across the system at one or more layers.

3. The method according to claim 2, wherein the layers include a cloud or physical layer, a virtual layer, and an application layer.

4. The method according to claim 1, further comprising identifying local causal relationships.

5. The method according to claim 1, further comprising identifying remote causal relationships.

6. The method according to claim 1, so as to provide a solution associated with at least one of the list consisting of discovery of anomaly detection schemes; alert learning; resource bottleneck detection; identification of sensitive resources; general purpose testing of an application before operational deployment, application capacity testing; and operational cost estimation, labelled data generation for supervised causality inference and machine learning techniques.

7. The method according to claim 1, wherein, the causal model is built up based on elementary fault behaviors.

8. The method according to claim 7, wherein the elementary fault behaviors comprise one or more tiles defined for a predetermined application node types and computing resource types.

9. The method according to claim 8, wherein at least one or each of the one or more tiles includes a hidden part and a visible part.

10. The method according to claim 8, wherein two or more tiles are combined to form a complex tile.

11. A non-transitory computer readable storage medium storing computer-executable instructions, which when executed by a processor, cause the processor to perform the method according to claim 1.

12. A system for determining system problems within a defined controlled environment having at least part of the environment linked with a virtual infrastructure, the system problems being associated with treatment of a query instigated, in use, by a user, the system comprising:

at least one processor; and
at least one memory including computer program code,
the at least one memory and the computer program code configured to, with the at least one processor, cause the system to
determine one or more nodes associated with the treatment of the query, wherein a node is an occurrence of at least one of a virtual machine, or a software program;
generate one or more stimuli associated with the treatment of the query wherein at least one or each of the one or more stimuli is configured to perturb one or more resources within the system;
measure data at each or at least one of the one or more nodes relating to the resources to determine the effect of at least one or each of the stimuli at each or at least one of the one or more nodes;
pair the one or more nodes in one or more groups of two or more nodes, wherein each group has an identified correlation in the measured data;
transform the correlation into a causal relationships where the cause is a measuring device directly measuring the stimulated resource and the consequences are other correlated measuring devices;
generate a list of causal relationships; and
combine different causal relationships into a causal model so that a chain of causal propagations can be built,
wherein the stimuli comprise at least one of a negative resource stimulus, a positive resource stimulus, and a positive load stimulus.

13. The system according to claim 12, wherein at least one or each of the one or more stimuli creates a set of perturbations in one or more resources which expand across the system at one or more layers.

14. The system according to claim 13, wherein the layers include a cloud or physical layer, a virtual layer, and an application layer.

* * * * *